United States Patent [19]

Aldridge et al.

[11] 4,037,081
[45] July 19, 1977

[54] ELECTRO-LUNCH BUCKET

[76] Inventors: Bobby V. Aldridge, c/o George Spector, 3615 Woolworth Bldg., 233 Broadway; George Spector, 3615 Woolworth Building, 233 Broadway, both of New York, N.Y. 10007

[21] Appl. No.: 698,076

[22] Filed: June 21, 1976

[51] Int. Cl.² .................. F27D 11/02; A21B 1/52
[52] U.S. Cl. .................................. 219/387; 99/416; 219/435; 219/521; 219/531; 219/533
[58] Field of Search ............ 219/385, 386, 387, 432, 219/435, 521, 524, 531, 533; 126/266; 99/416; 165/58, 59

[56] References Cited
U.S. PATENT DOCUMENTS

| 2,187,196 | 1/1940 | Douglass | 219/387 |
| 2,295,221 | 9/1942 | King | 219/387 |
| 2,545,127 | 3/1951 | Wnuk | 219/387 |
| 2,577,870 | 12/1951 | Aston | 219/387 |
| 2,611,851 | 9/1952 | Lott | 219/387 |
| 2,658,986 | 11/1953 | Gronlund | 219/387 |
| 2,839,654 | 6/1958 | Jones et al. | 219/387 |
| 3,482,078 | 12/1969 | Milne | 219/387 |
| 3,591,798 | 7/1971 | Torres | 219/387 |
| 3,808,401 | 4/1974 | Wright et al. | 219/387 |
| 3,869,595 | 3/1975 | Collins et al. | 219/387 |

Primary Examiner—Volodymyr Y. Mayewsky

[57] ABSTRACT

A lunch bucket containing an electric heating coil that can be plugged into a household electric outlet, so to heat up a compartment in the bucket for holding hot foods, while another compartment is insulated therefrom so to contain cold foods.

1 Claim, 4 Drawing Figures

U.S. Patent
July 19, 1977
4,037,081
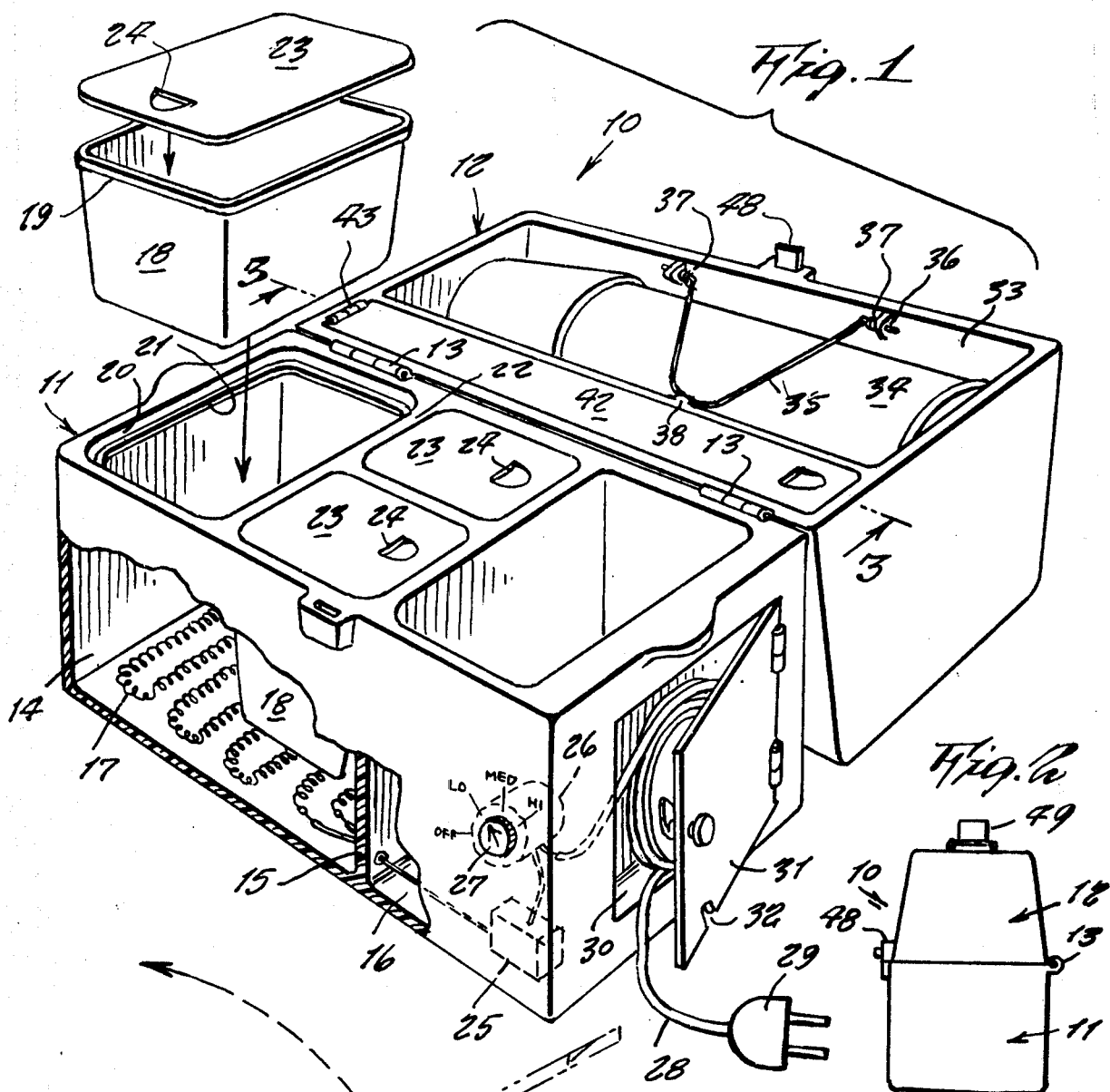
Fig. 1
Fig. 2
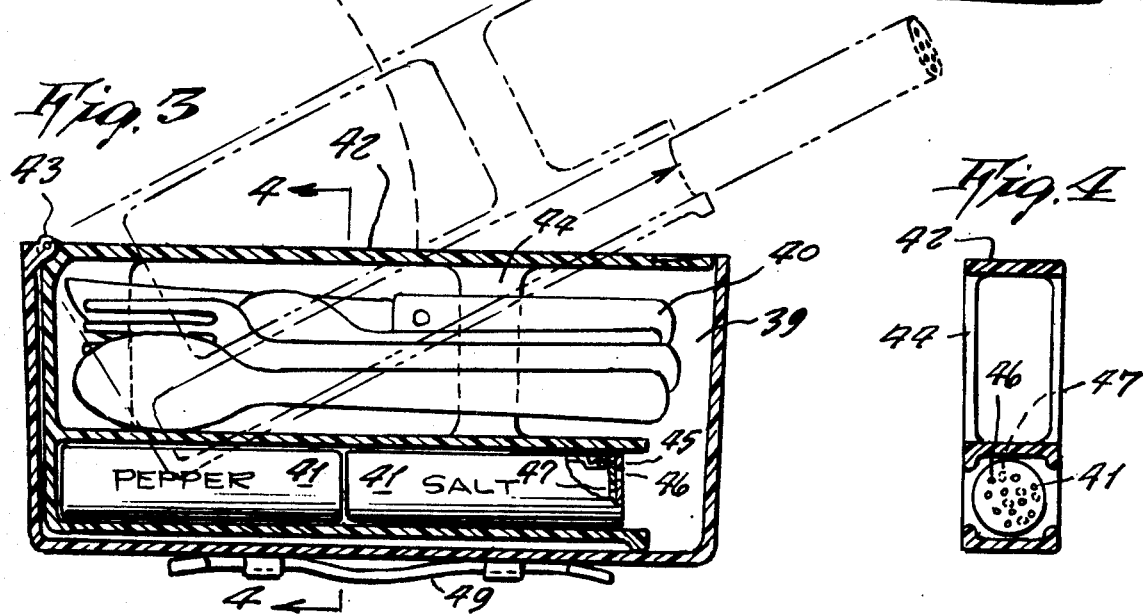
Fig. 3
Fig. 4

ELECTRO-LUNCH BUCKET

This invention relates generally to lunch buckets.

It is well known that a conventional lunch bucket is used to carry some cold sandwiches and possibly some fruit for a desert, along with a bervage. This kind of a diet eventually becomes tiring particularly when the lunch bucket is used every day because there is not enough variety in the food. This situation is therefore in want of an improvement.

Accordingly, it is principal object of the present invention to provide a lunch bucket that is designed to additionally carry hot foods such as soup or a hot main course including heated meats and vegetable side dishes so that a greater variety of more satisfying food is eaten.

Another object is to provide a lunch bucket that has an electric heating coil up such compartments of the bucket that contain hot foods, while an unheated compartment serves to contain cold foods.

Other objects are to provide an ELECTRO-LUNCH BUCKET which is simple in design, inexpensive to manufacture, rugged in construction easy to use and efficienct in operation.

These and other objects will readily evident upon a study of the following specification and the accompanying drawing wherein:

FIG. 1 is a perspective view of the invention shown in opened position.

FIG. 2 is an end view thereof shown closed.

FIG. 3 is a cross section on line 3—3 of FIG. 1 and showing a design whrein the silverwear are in a receptacle that is upwardly pivotable so to be easily accessible and wherein the receptacle also carries salt and pepper shakers.

FIG. 4 is a cross section on line 4—4 of FIG. 3.

Referring now to the drawing in greater detail, the reference number 10 represents an electro lunch bucket according to the present invention wherein there is an insulated case 11 and cover 12 pivotally attached together by hinges 13.

The case has a compartment 14 separated by an insulated partition 15 from a compartment 16, the compartment 14 containing an electric heating coil 17 along its bottom in order to heat foods that are containing within removable trays 18, and which are supported in elevation positions over the coils 17 by means of a flange 19 of the trays resting in grooves 20 of opening 21 formed in a top wall 22 of the case. Removable covers 23, having finger lifting recesses 24, serve to close the individual trays.

The heating coil is connected to a thermostat heat range unit 25 and to a rheostat switch 26 having external control knob 27 so to adjust the heat to any desired temperature. An extension cord 28, connected at one end to the switch, has a male plug 29 at its other end for attachment to a household electric outlet socket. The cord 28 is stored rolled up in an end compartment 30 provided only for it on one end of the case, the compartment 30 being closable by a hinged door 31. A small notch 32 on an edge of the door ellows the door to be retained closed while the cord extends outwardly of the case, during use.

The compartment 16 is used for holding cold foods.

The cover 12 has a compartment 33 in which a thermosbottle 34 is removably placable and is retained therewithin by a wire clip 35 pivotable in lug bearing opening 36, so that the thermosbottle does not fall out when thecover is opened upwardly. The wire clip is spring loaded by springs 37 so to bear against the thermosbattle. A lug 38 on the case alternately can be used to hold the clip in locking position.

Another compartment 39 is formed in the over for containing silverwear 40 and salt an pepper shakers 41. The compartment 39 is closable by a lid 42 pivotable about a hinge 43, the underside of the lid 42 having a cage 44 integral therewith and which fits into the compartment 39. The cage supports the silverwear and shakers which can be readily therefrom where the lid 42 is upwardly tilted as shown in FIG. 3. Each shaker includes a rotatable cap 45 having opeining 46 that align with openings 47 in a forward end wall of the shaker so to allow dispensing the content, and which when disaligned, prevent exterior moisture to enter the shaker.

A latch 48 secures the case 11 and cover 12 in a closed position when the lunch bucket is being carried by its handle 49.

It is understood that in a modified design that the heating coil can be rechargable dry cell batteries contained inside the case, so that the lunch bucket can be heated when in an area away from a household electric supply.

Thus a useful electro lunch bucket is provided.

While various changes may be made in the detail construction, it is understood that such changes will be within the spirit and scope of the present invention, as is defined by the appended claims.

We claim:

1. An electro-lunch bucket, comprising in combination, a case and hollow compartmented cover pivotally hinged together, said case and cover being of thermally and electrically insulating material, a first compartment in said case for hot food and a second compartment in said case for cold food, said comprtments being separated by an upstanding thermally insulating wall, said first compartment having a bottom wall supporting electric heating coil for heating foods in covered trays mounted in said first compartment, said coil being connected to a heat control unit and switch having means electric lead for connection to an electric power source, said first compartment having an upper opening encompassed by a ledge to support said trays by means of a flange about the tray top cover having a first compartment formed internally of said cover to house a thermosbottle retained from falling out by a pivotable wire clip, and including a second compartment formed in said cover to store silverware and a salt and pepper shaker supported in a cage formed on an underside of a lid of said second compartment of said cover, said lid being pivotally secured on one end to the underside of the cover, whereby said lid and cage may be pivotally move to an open position externally of the cover compartments.

* * * * *